United States Patent [19]
Bezos

[11] Patent Number: 5,873,638
[45] Date of Patent: Feb. 23, 1999

[54] DUAL PURPOSE END OF TRAIN DEVICE FOR ELECTRICALLY CONTROLLED PNEUMATIC FREIGHT BRAKE SYSTEMS

[75] Inventor: Angel P. Bezos, Rockville, Md.

[73] Assignee: Westingthouse Air Brake Company, Wilmerding, Pa.

[21] Appl. No.: 816,527

[22] Filed: Mar. 13, 1997

[51] Int. Cl.[6] .................................................. B60T 15/46
[52] U.S. Cl. ................................................ 303/47; 73/129
[58] Field of Search .................................. 303/47, 7, 20; 246/169 R, 167 R; 73/129; 213/1.3

[56] References Cited

U.S. PATENT DOCUMENTS

| | | | |
|---|---|---|---|
| 5,235,849 | 8/1993 | Egerton | 73/129 |
| 5,267,473 | 12/1993 | Bezos et al. | 73/129 |
| 5,374,015 | 12/1994 | Bezos et al. | 246/169 R |
| 5,377,938 | 1/1995 | Bezos et al. | 246/167 R |
| 5,673,876 | 10/1997 | Lumbis et al. | 246/169 R |

*Primary Examiner*—Robert J. Oberleitner
*Assistant Examiner*—Melanie Torres
*Attorney, Agent, or Firm*—Whitham, Curtis & Whitham

[57] ABSTRACT

An adapter converts a conventional two-way end of train unit (EOT) to a dual purpose EOT that can be used conventionally for those trains not equipped with a power line for the new electrically controlled pneumatic (ECP) freight train brake standard but which can be quickly and inexpensively modified to change the function of the EOT from the normal two-way EOT function to the ECP EOT function as defined by the Association of American Railroads (AAR). An electronics package or adapter plugs into the battery compartment of the standard EOT and makes connections with the standard EOT electrical connectors that are located in the battery compartment. This adapter is designed to communicate with the standard EOT microprocessor and to configure the standard EOT in a way that the standard EOT in combination with the adapter functions as an ECP EOT rather than as a standard EOT. The EOT is provided with the necessary intelligence to be able to detect the presence of the adapter and to then conform to the required ECP functionality.

14 Claims, 4 Drawing Sheets

DUAL PURPOSE END OF TRAIN DEVICE FOR ELECTRICALLY CONTROLLED PNEUMATIC FREIGHT BRAKE SYSTEMS

DESCRIPTION

BACKGROUND OF THE INVENTION

1. Field of the Invention

The present invention generally relates to intra-train communications for implementing Electrically Controlled Pneumatic (ECP) railroad freight train brakes and, more particularly, to an adapter for a standard End of Train device (EOT) that converts a standard EOT device that has had its software modified with the necessary intelligence to be able to conform to either the standard functionality or the ECP functionality in an ECP type of EOT device.

2. Background Description

End of Train (EOT) signaling and monitoring equipment is now widely used, in place of cabooses, to meet operating and safety requirements of railroads. The information monitored by the EOT typically includes the air pressure of the brake line, battery condition and train movement. A warning light is incorporated into the EOT housing, and the operation of this warning light is also monitored. This information is transmitted to the crew in the locomotive by a battery powered telemetry transmitter.

The original EOT telemetry systems were one-way systems; that is, data was periodically transmitted from the EOT to a Locomotive Control Unit (LCU), sometimes referred to as the Head of Train (HOT) unit, mounted in the locomotive where the information was displayed. More recently, two-way systems have been introduced wherein transmissions are made by the LCU to the EOT. In one specific application, the EOT controls an air valve in the train's brake pipe which can be controlled by a transmission from the LCU. In a one-way system, service and emergency brake application starts at the locomotive and progresses along the brake pipe to the end of the train. This process can take significant time in a long train, and if there is a restriction in the brake pipe, the brakes beyond the restriction may not be actuated. With a two-way system, emergency braking can be initiated at the end of the train independently of the initiation of emergency braking at the head of the train, and the process or brake application can be considerably shortened. As will be appreciated by those skilled in the art, in order for an LCU to communicate emergency commands to an associated EOT, it is desirable for the EOT to be "armed"; that is, authorized by railroad personnel. This is desirable to prevent one LCU from erroneously or maliciously actuating the emergency brakes in another train. To this end the LCU includes a nonvolatile memory in which a unique code identifying an EOT unit can be stored. The LCU also has a row of thumb wheel switches which allows manual entry of codes. Additional background on EOT systems may be had by reference to U.S. Pat. Nos. 5,374,015 and 5,377,938, both to Bezos et al. and assigned to the assignee of this application.

The Federal Communication Commission (FCC) allocates blocks of radio frequencies for railroad communications. The Association of American Railroads (AAR) then further allocates the frequencies on a channel basis, which are then used by radio-based intra-train communications systems. The AAR develops standards for the railroad industry for, among other things, intra-train communications. Most recently, the AAR is considering an intra-train communication system in which all the cars in a consist are hard wired together. In such a system, power to and communications with the EOT is provided over a cable extending the length of the train. To this end, the AAR has promulgated draft specifications for Electrically Controlled Pneumatic (ECP) Freight Brake Systems, revision #9, Nov. 27, 1996, that requires a special EOT device, hereinafter referred to as an ECP EOT, as specified on page 2, paragraph 2.1.6. As specified in that paragraph, this special ECP EOT will contain a "neuron" chip (a commercially available integrated circuit (IC) chip), a brake pipe pressure transducer and a battery which will be charged off the train line voltage. Presumably, this ECP EOT will also need a standard marker warning light, although the specifications fail to mention this.

Since freight trains can be a mile or more in length, the AAR has determined that the voltage on the cable must be 230 VDC in order to provide adequate power to the ECP EOT. To insure safety of personnel and continuity of the cable, it is necessary to transmit status signals from the ECP EOT to a Head End Unit (HEU). First, before the 230 VDC power can be turned on, it is necessary to insure the safety of personnel to make sure that the cable has been properly terminated in the ECP EOT and does not pose a shock hazard. When the cable has been properly terminated, the ECP EOT, under battery power, communicates this to the HEU via the 230 VDC power lines, allowing the engineer to turn the 230 VDC power on or allowing the HEU to automatically turn the 230 VDC power on. In addition, since the 230 VDC line could be broken either intentionally or accidentally, the ECP EOT must periodically transmit a status message to insure the continuity (i.e., no breaks) of the 230 VDC cable connection, thus further insuring personnel safety.

The AAR specifications suggest that the ECP EOT should be a different unit from the currently manufactured standard two-way EOT, owing in part to the specification for the "neuron" microprocessor and power line modem transceiver and the fact that the cable interface eliminates the need for a high capacity rechargeable battery to power the EOT. However, railroads which use this equipment want to standardize equipment to minimize the logistics of their inventory and maintenance. Manufactures of the equipment also want to standardize their products in order to improve quality and realize savings.

SUMMARY OF THE INVENTION

It is therefore an object of the present invention to provide an adapter which converts a standard EOT so that it may function as a dual purpose EOT that can be used conventionally for those trains not equipped with the 230 VDC ECP power line transceiver but which can be quickly and inexpensively modified to change the function of the EOT from the normal two-way EOT function to the ECP EOT function as defined by the AAR.

It is another object of the invention to provide an EOT with the necessary intelligence to be able to conform to the required ECP functionality when necessary.

According to the invention, there is provided an electronics package or adapter that conforms to the dimensions of the battery pack of the standard EOT. This adapter plugs into the battery compartment of the standard EOT, making connections with both the power connector normally engaged by the battery pack and the connector, such as an RS232 serial connector, normally used for test purposes. When this package is plugged into the battery compartment, the function of the EOT is changed to conform with the ECP EOT function defined by the AAR. This adapter includes a standard ECP connector connected by a cable to the adapter and extending outside the adapter when mounted in the battery compartment. A DC to DC converter reduces a high voltage from the cable to a low voltage and supplies the low voltage to a battery charger which maintains a charge on a small, rechargeable battery. A power supply connected to receive power from the battery and the DC to DC converter supplies power to the EOT derived from the battery when no power is input to the DC to DC converter but otherwise supplies power to the EOT derived from the DC to DC converter. A "neuron" transceiver connected to the cable and powered by the power supply detects when the ECP connector has been connected to a train cable and properly terminates the train cable. Microprocessor electronics connected to the "neuron" transceiver and powered by the power supply responds to the detection from the "neuron" transceiver by transmitting information to the EOT to transmit a status message of the detection to the HEU via the "neuron" transceiver. The firmware of the EOT microprocessor is modified to support the ECP function.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
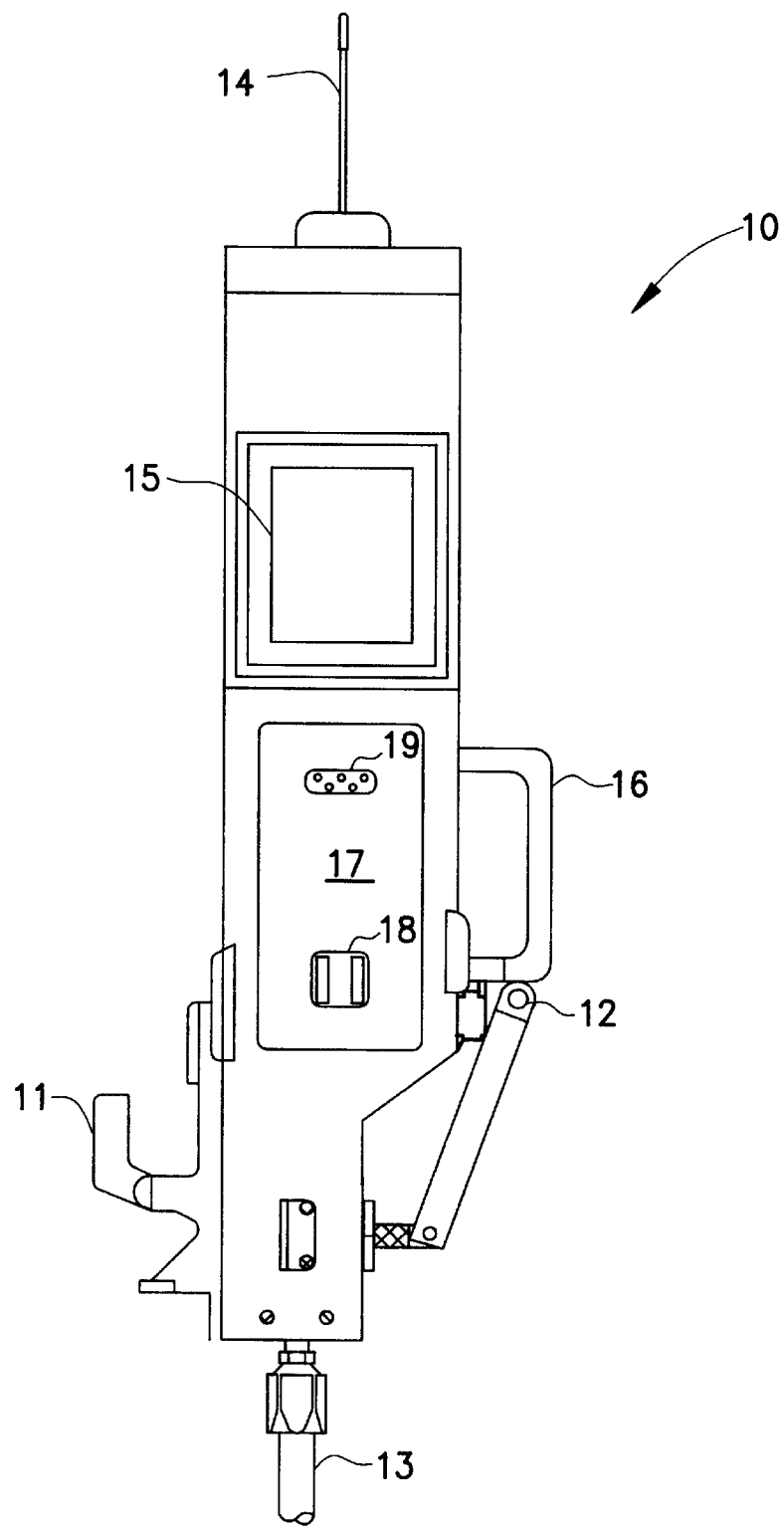
FIG. 1 is an elevation view of a standard two-way EOT showing the location of the battery compartment.

Referring now to the drawings, and more particularly to FIG. 1, there is shown an elevation view of the standard two-way EOT 10 currently manufactured and in widespread use in the railroad industry. The EOT illustrated is manufactured by Pulse Electronics, Inc., but is representative of two-way EOTs of other manufacturers as well. The EOT 10 is designed to the mounted on the trailing coupler of the last car in the train and is equipped with pressure monitoring and telemetry circuitry. Mounting is by means of a coupler hook mount 11 which engages a coupler and is clamped in place by a coupler mount tightening handle 12. A hose 13 is connected between the train's brake pipe and the EOT unit so that the air pressure of the brake pipe at the end of the train can be monitored.

As shown and described in more detail in U.S. Pat. Nos. 5,374,015 and 5,377,938, the EOT includes a microprocessor control circuit, and a nonvolatile memory in which the control program for the microprocessor controller and a unique identifier code of the particular EOT are stored. The EOT communicates with a radio transceiver of the lead locomotive by way of its own radio transceiver, the antenna 14 for which is installed at the top of the EOT. This transceiver and antenna is operational only when the EOT is used as a standard two-way EOT. The EOT is also provided with a marker warning light 15 which flashes periodically and which is monitored by the EOT microprocessor. A carrying handle 16 is provided to allow railroad personnel to carry and mount the EOT 10.

A battery compartment 17 houses a battery pack (not shown) which plugs into the battery compartment. The battery pack includes a heavy duty rechargeable battery, such as a lead acid battery or a nickel cadmium battery, and when plugged in, is retained by clamps or fasteners. As shown in FIG. 1, there are two connectors in the back of the battery compartment. One of these is the power connector 18 to which the battery pack is connected when the battery pack is plugged into the battery compartment. The second connector is a standard RS232 serial connector 19 which is normally used only for testing purposes.

The AAR ECP EOT specification states that the EOT must be connected to the network and must be transmitting status messages to the HEU before the train line power can be energized. Thus, by implication, the EOT must have its own source of power (e.g., a battery) in order to transmit status messages before the 230 VDC power is turned on. The present invention takes advantage of the fact that the battery for the ECP EOT need not be physically large since, when the train is on the road, the EOT will draw its power from the 230 VDC power line. Therefore, in place of the battery pack, the present invention provides an adapter unit, packaged to conform to the shape of the battery pack it replaces, that is removably installed in the EOT battery compartment.

Figure 2A:
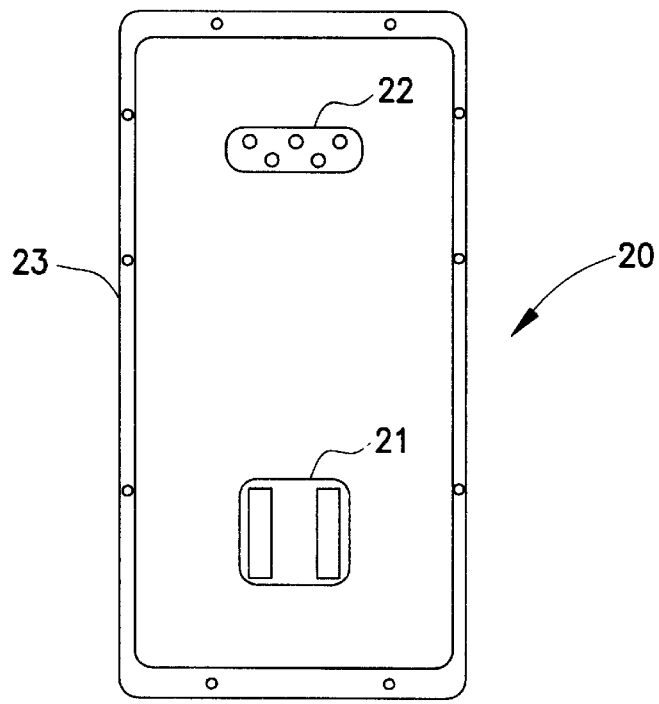
FIGS. 2A and 2B are, respectively, rear and front views of the adapter which plugs directly into the battery compartment of the standard two-way EOT to convert the standard two-way EOT to the ECP EOT specifications of the AAR.
Figure 2B:
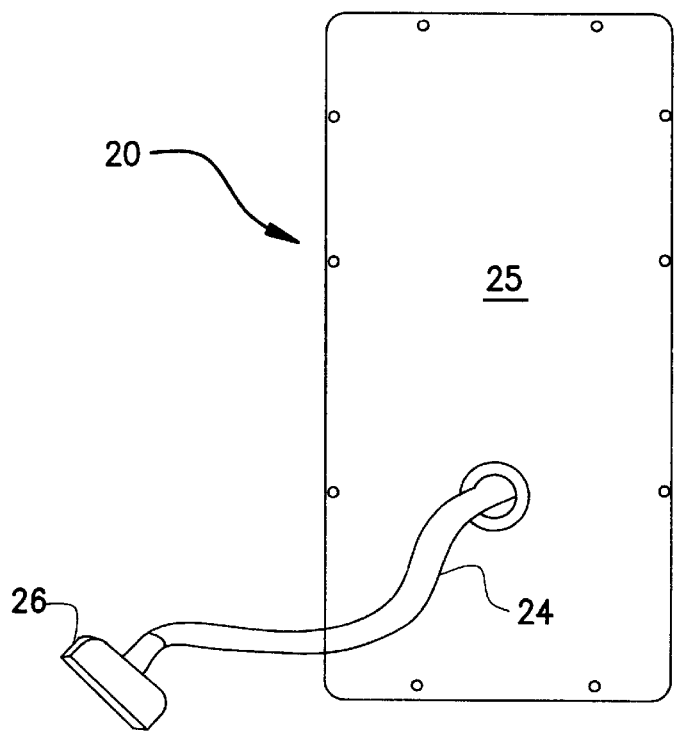

The adapter is shown in FIGS. 2A and 2B. FIG. 2A shows the rear of the adapter 20 and the mating power connector 21 and RS232 connector 22 which respectively plug into connectors 18 and 19 in the back of the battery compartment 17. A flange 23 surrounding the front face of the battery pack is used to secure the battery pack in the battery compartment 17. FIG. 2B shows the front of the adapter 20. A cable 24 emanates from the face plate 25 and is terminated in a 230 VDC connector 26 which is designed to mate with a corresponding connector on the cable installed on the railroad car.

Figure 3:
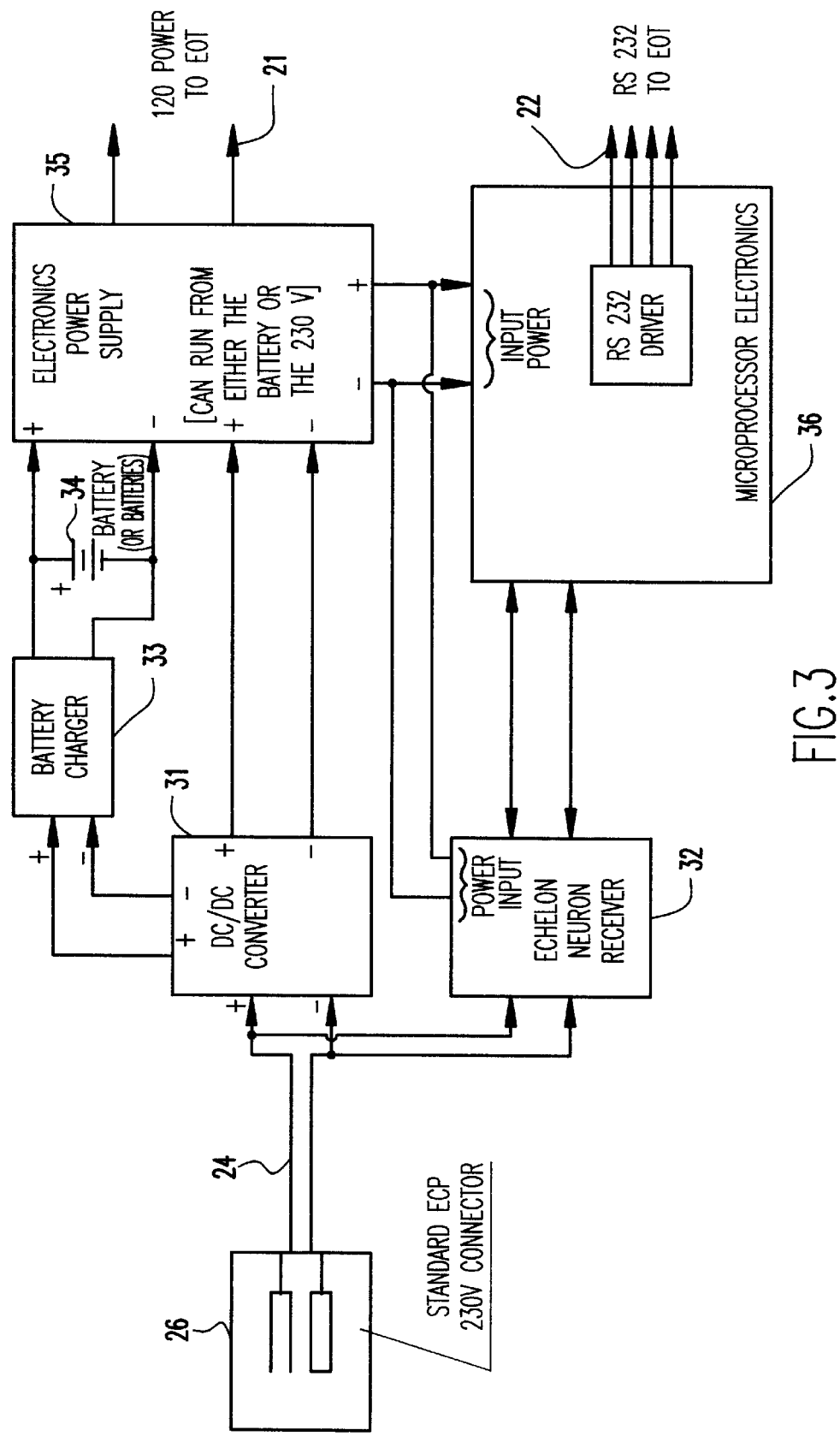
FIG. 3 is a block diagram of the circuitry of the ECP EOT adapter shown in FIG. 2.

FIG. 3 is a block diagram of the adapter electronics. Externally, the ECP 230 VDC connector 26 is connected by the cable 24 to the circuitry of the adapter. The cable 24 provides a 230 VDC connection to a DC to DC converter 31. The cable 24 is also connected to a "neuron" transceiver 32, as specified by the AAR. The "neuron" transceiver 32 conforms to the specifications of the Echelon Corporation and is comprised of two commercially available components. The first is the "neuron" chip which is a sophisticated very large scale integrated (VLSI) device that incorporates communications, control, scheduling and input/output (I/O) support. The neuron chip enables devices to communicate with one another using the Echelon LonTalk™ protocol which supports distributed, peer-to-peer communication. Neuron chips, model numbers 3120 and 3150, are manufactured and distributed world wide by Motorola and Toshiba. The second component is the PLT-10 power line transceiver module, model 50080, which supports the Echelon LonWorks™ power line communication technology.

The DC to DC converter 31 provides a reduced voltage output to a battery charger 33 which maintains a trickle charge on rechargeable 12 V battery 34. This battery is quite small compared to the size of the heavy duty battery normally housed in the battery compartment. The DC to DC converter 31 also supplies a reduced voltage to the electronics power supply 35 which provides 12 V power to the EOT via connector 21. Before the EOT is connected to the train's 230 VDC cable and the power is turned on, the power output to the EOT is derived from battery 34, but once the power is turned on, the power output to the EOT is derived from the DC to DC converter 31. This is automatically sensed and the switch made by the electronics power supply 35.

The power supply 35 also provides 12 V power to the neuron transceiver 32 and the microprocessor electronics 36. The microprocessor electronics 36 serves as an interface between the EOT microprocessor and the neuron transceiver 32. The microprocessor electronics 36 cooperates with modified firmware of the EOT microprocessor to cause the EOT to conform to the ECP functionality. Specifically, when the adapter is plugged into the battery compartment, the RS232 connection provides the channel for the microprocessor electronics 36 to notify the EOT microprocessor of the presence of the adapter. This notification causes the EOT firmware to toggle the operation of the EOT from a standard twoway EOT function to the ECP EOT function. That is, the EOT stops transmitting via its radio transceiver and provides the brake pipe pressure data via the RS232 connection while maintaining the marker light functionality. Of course, when the EOT does not receive the proper commands via the RS232 connection, it functions as a standard two-way EOT. The modified EOT firmware is illustrated in FIG. 4 and described below.

The neuron transceiver 32 detects that the train's 230 VDC cable has been connected to the EOT in a proper and safe termination of the 230 VDC cable. This is communicated to the microprocessor electronics 36 which communicates with the EOT microprocessor via the RS232 connector 22. In response to a detected connection to the 230 VDC cable, the microprocessor electronics 36 notifies the EOT microprocessor which, in turn, causes status messages to be transmitted to the HEU via the neuron transceiver 32. In the alternative, the microprocessor electronics 36 may incorporate a dedicated microprocessor which sends status messages to the HEU independent of the EOT microprocessor. This alternative has the advantage of minimizing software modifications required for the EOT microprocessor. Only after receiving the status message that the EOT is connected and properly terminating the 230 VDC cable does the HEU cause the 230 VDC power to be turned on.

Once the 230 VDC power is turned on, the EOT continues to function as an ECP EOT. The main piece of information that the ECP EOT needs and that the standard EOT has is the brake pipe pressure. The adapter according to the invention communicates with the standard EOT via the RS232 connector and extracts this information from the EOT microprocessor.

Figure 4:
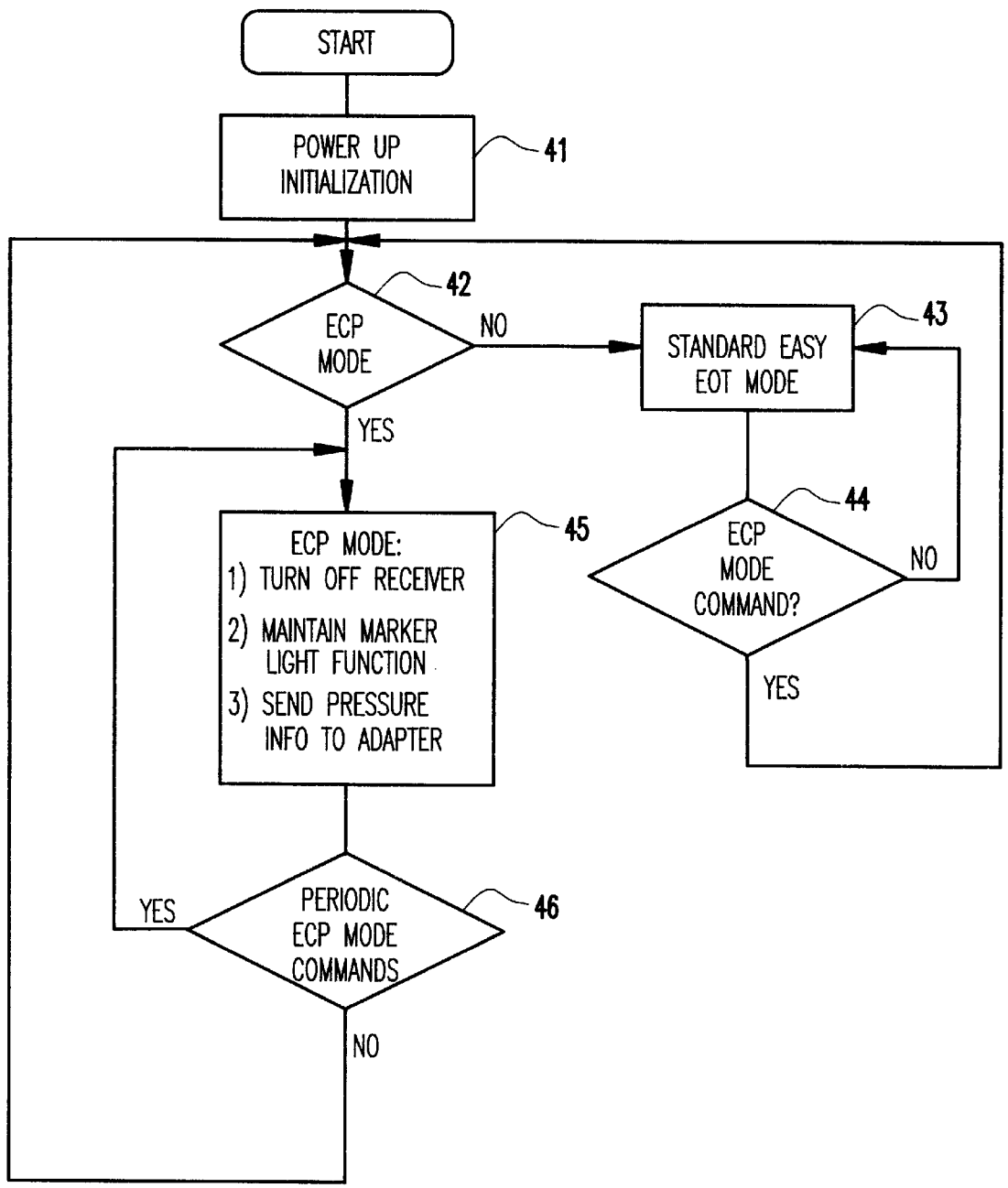
FIG. 4 is a flow chart showing the modification of the firmware for the EOT microprocessor.

FIG. 4 is a flow chart illustrating the logic of the modified EOT firmware. The process starts by either a standard battery pack or the ECP adapter being plugged into the battery compartment of the EOT. Power to the EOT microprocessor is turned on either by the act of plugging in the standard battery pack or the ECP adapter or additionally turning on a power switch. In either case, the EOT microprocessor goes through its usual power up initialization in function block 41. Then, in decision block 42, the EOT microprocessor determines whether it is to operate in the ECP mode. That is, has the EOT microprocessor received the appropriate ECP commands via the RS232 connection from the microprocessor electronics 36? If not, the firmware defaults to the standard two-way EOT processing in function block 43. Even after defaulting to standard two-way EOT processing, if an ECP mode command is received, as detected in decision block 44, the process will loop back to decision block 42.

If the EOT microprocessor is to operate in the ECP mode, the process goes to function block 45 where the radio transceiver in the EOT is turned off but the marker light continues to operate. In addition, brake pressure data is supplied to the adapter. A test is made in decision block 46 to determine if periodic ECP mode commands are being received from the adapter. If so, the process continues to loop back to function block 45 to maintain the EOT in ECP mode. If not, the process loops back to decision block 42 to determine if the EOT should default to the standard two-way EOT mode.

When in the ECP mode, the EOT microprocessor obtains a current readings of the brake pipe pressure and transmits this data to the microprocessor electronics 36 shown in FIG. 3. A dedicated microprocessor in the microprocessor electronics formats a message including both the cable connection status and the brake pipe pressure. The formatted message is then transmitted by the microprocessor electronics 36 for modulation and transmission on the 230 VDC line by the neuron transceiver 32. Should continuity be broken, then no further status messages will be formatted and transmitted to the HEU. In that case, a time out function at the HEU would detect this condition and provide a warning to the engineer. It is also possible to provide and additional function at the EOT which, when continuity of the 230 VDC cable is lost, will reactivate the radio transceiver of the EOT and transmit this information to the HEU.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An adapter for mounting in a battery compartment of a two-way end of train unit (EOT) to conform the unit for use in electrically controlled pneumatic (ECP) freight brake systems comprising:

an ECP connector connected by a cable and extending outside the battery compartment when the adapter is mounted in the battery compartment;

an interface for communicating with a microprocessor in the EOT; and a transceiver connected between the interface and the cable for transmitting and receiving messages.

2. The adapter recited in claim 1 wherein the interface extracts brake pipe pressure from the microprocessor and periodically transmits brake pipe pressure data in status messages via the transceiver.

3. The adapter recited in claim 2 wherein the interface formats the status messages which are transmitted via the transceiver.

4. The adapter recited in claim 2 wherein the battery compartment of the EOT has first and second connectors, the first connector mating with a third connector on the adapter and supplying power to the EOT and the second connector mating with a fourth connector on the adapter and providing a connection between the interface and the microprocessor.

5. The adapter recited in claim 4 further comprising a power supply connected to the cable and supplying power to the third connector and power to the interface and transceiver in the adapter.

6. The adapter recited in claim 5 wherein the power supply comprises:

a DC to DC converter connected to the cable and reducing a high voltage from the cable to a low voltage;

a battery charger receiving the low voltage and maintaining a charge on a small, rechargeable battery; and an electronics power supply connected to receive power from the battery and the DC to DC converter, the electronics power supply supplying power to the EOT via the third connector and to the interface and transceiver derived from the battery when no power is input to the DC to DC converter but otherwise supplying power derived from the DC to DC converter.

7. The adapter recited in claim 5 wherein the transceiver is a "neuron" transceiver connected to the cable which detects when the ECP connector has been connected to a train cable and properly terminates the train cable and notifies the microprocessor via the interface of the termination.

8. A two-way end of train unit (EOT) comprising a microprocessor and a radio transceiver in a housing for mounting on a trailing coupler of a last car in a train, said housing having a battery compartment for optionally receiving a battery pack for powering the EOT or an adapter to conform the EOT for use in electrically controlled pneumatic (ECP) freight brake systems, said microprocessor communicating with the adapter when the adapter is inserted in the battery compartment and toggling to an ECP mode of operation.

9. The two-way EOT recited in claim 8 wherein the microprocessor when toggling to an ECP mode of operation turns off the radio transceiver.

10. The two-way EOT recited in claim 8 wherein the microprocessor when toggling to an ECP mode of operation maintains a marker light function of the EOT.

11. The two-way EOT recited in claim 8 wherein the microprocessor when toggling to an ECP mode of operation continues to obtain brake pipe pressure information and passes the brake pipe pressure information to the adapter.

12. The two-way EOT recited in claim 8 wherein the adapter comprises:

an ECP connector connected by a cable and extending outside the battery compartment when the adapter is mounted in the battery compartment;

an interface for communicating with the microprocessor in the EOT; and a power line transceiver connected between the interface and the cable for transmitting and receiving messages over a power line connected to the ECP connector.

13. The two-way EOT recited in claim 12 wherein the microprocessor in response to a command from the interface formats a status message which is transmitted by the power line transceiver.

14. The two-way EOT recited in claim 12 wherein the adapter interface formats a status message which is transmitted by the power line transceiver.

\* \* \* \* \*